United States Patent Office 3,706,680
Patented Dec. 19, 1972

3,706,680
FOAMED POLYURETHANES PREPARED FROM
DIPHENOLS AND POLYISOCYANATES
Llewellyn Delphin Booth, Lake Jackson, Tex., assignor
to The Dow Chemical Company, Midland, Mich.
No Drawing. Continuation-in-part of application Ser. No.
781,261, Dec. 4, 1968. This application Nov. 30, 1970,
Ser. No. 93,808
Int. Cl. C08g 22/44, 22/06
U.S. Cl. 260—2.5 AM
5 Claims

ABSTRACT OF THE DISCLOSURE

The invention concerns polyurethanes prepared from diphenols and polyisocyanates. It relates more particularly to polyurethane foams of diphenols and polyisocyanates.

---

This application is a continuation-in-part of my copending application Ser. No. 781,261 filed Dec. 4, 1968, now abandoned.

The invention concerns polyurethanes prepared from diphenols and polyisocyanates. It relates more particularly to polyurethane foams of diphenols and polyisocyanates.

It is known to prepare polyurethane compositions, particularly polyurethane foams, from polyisocyanates and oxyalkylated derivatives of polyhydric alcohols or oxyalkylated phenol-aldehyde resins, or other organic compounds containing at least two active hydrogen-containing groups e.g. polyesters.

The polyurethane compositions, especially the foams have many desirable properties. The rigid foams have great structural strength. In sandwich-type constructions they exhibit a high degree of rigidity, a property particularly suitable for building purposes, and because of the closed cell, or substantially closed cell structure, they are excellent heat and sound insulators.

Industry is constantly searching for better components for use in the polyurethane foam compositions, that have the advantages of lower cost, or that will improve the foam properties, or enhance the resistance to burning, or render it self-extinguishing or non-burning.

It has now been discovered that polyurethane compositions prepared from diphenols containing two active OH groups as determined by the Zerewitinoff method, which are reacted with an organic polyisocyanate, not only possess improved physical properties, but the diphenol resin has a surprising action of rendering the compositions flame resistant, fire retardant, self-extinguishing and substantially non-burning.

The diphenols to be employed in the invention are compounds having the general formula

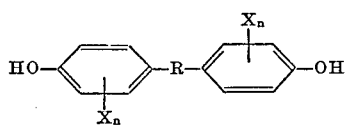

wherein R is an alkylidene radical, containing from 1 to about 8 carbon atoms,

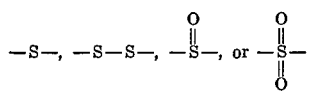

X is halogen, or an alkyl radical, preferably having from 1 to 12 carbon atoms and $n$ is a positive integer from 0 to 3.

The diphenol starting materials are preferably 4,4'-isopropylidene diphenols having the general formula

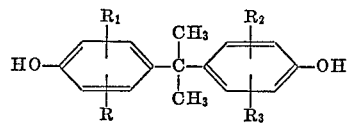

wherein R, $R_1$, $R_2$, and $R_3$ are independently selected from the group consisting of hydrogen, chlorine, bromine, and alkyl radicals having from 1 to 12 carbon atoms.

The diphenols are prepared by condensing phenol or an ortho or meta substituted derivative thereof such as cresol, xylenol, resorcinol, chlorophenol, bromophenol, ispropylphenol, tert.-butylphenl, octylphenol, nonylphenol, or dodecylphenol with an aldehyde or a ketone in admixture with a Friedel Crafts catalyst such as ferric chloride and a hydrohalic acid at reaction temperatures between about 60 to 160° C. Among suitable diphenols are the diphenols described in U.S. Pats. Nos. 2,482,748; 2,503,196; 2,894,004; 2,919,294; and 2,925,444.

Specific examples of such diphenols are 4,4'-isopropylidene diphenol,
4,4'-isopropylidene-bis(2-isopropylphenol),
4,4'-(4-cyclohexyl-1-butylidene)-bis(2-isopropylphenol,
4,4-(4-cyclohexyl-1-methyl-butylidene)bisphenol,
4,4'-(2-cyclohexylethylidene)-bisphenol,
4,4'-cyclohexylidenebis(2-tertiary-butylphenol),
4,4'-benzylidene(2-tertiary-butylphenol),
4,4'-(4-tertiary-butylcyclohexylidene)bis(2-tertiary-butylphenol),
4,4'-cyclopentylidenebis(2-tertiary-butylphenol),
4,4'-3,5-dimethylbenzylidene)bis(2-tertiary-butylphenol),
4,4'-benzylidenediphenol,
4,4'-cyclohexylidenediphenol,
4,4'-isopropylidenebis(2-chlorophenol),
4,4-isopropylidene-bis(2-bromophenol) and
4,4'-isopropylidenebis 2,6-dibromophenol.

The aldehyde reactant can be formaldehyde, acetaldehyde, propionaldehyde or butyraldehyde, or a ketone such as acetone, methyl ethyl ketone, methyl isobutyl ketone, cyclohexanone or methyl cyclohexanone.

Suitable acidic catalysts are hydrogen chloride or hydrogen bromide.

The diphenols can range from liquid to fusible organic solvent soluble solids, and as previously stated can be used in whole, or in part, as the component or hydroxyl-containing organic compound to react with an organic polyisocyanate to form polyurethane compositions possessing improved physical properties and self-extinguishing characteristics.

The diphenols can be employed as the sole hydroxyl-containing compound or they can be used in admixture or blended with polyether polyols such as the adducts of one or more alkylene oxides having from 2 to 4 carbon atoms such as ethylene oxide, propylene oxide, or butylene oxide, with glycols, glycerol, 1,2,4-butanetriol, 1,2,6-hexanetriol, trimethylolpropane, pentaerythritol, sucrose, hexose, or sorbitol, or with polyols that are adducts of said alkylene oxides and Novolac resins, e.g. Novolac polyols, which polyols have hydroxyl numbers in the range of from about 30 to 1200. The diphenols can also be blended or mixed with polyesters containing hydroxyl groups reactive with organic polyisocyanates to form polyester-diphenol polyurethane compositions. In all such blends or mixtures the diphenol is preferably used in amount sufficient to provide at least 50 percent of the total reactive OH groups in the mixture.

Any organic aryl polyisocyanate can be employed in making the polyurethane compositions of the present invention. The isocyanate may contain two or more isocyanate radicals. Mixtures of the aryl polyisocyanates can be employed. It is preferred that the organic polyisocyanates be non-complexed, i.e. that they be free from complexing with a polymer prepared from an unsaturated monomer.

Among representative polyisocyanate compounds are:

toluene-2,4-diisocyanate,
1,5-naphthalenediisocyanate,
cumene-2,4-diisocyanate,
4-methoxy-1,3-phenylenediisocyanate,
4-chloro-1,3-phenylenediisocyanate,
4-bromo-1,3-phenylenediisocyanate,
4-ethoxy-1,3-phenylenediisocyanate,
2,4'-diisocyanatodiphenylether,
5,6-dimethyl-1,3-phenylenediisocyanate,
2,4-dimethyl-1,3-phenylenediisocyanate,
4,4'-diisocyanatodiphenylether,
benzidinediisocyanate,
4,6-dimethyl-1,3-phenylenediisocyanate,
9,10-anthracenediisocyanate,
4,4'-diisocyanatodibenzyl,
3,3'-dimethyl-4,4'-diisocyanatodiphenylmethane,
2,6'-dimethyl-4,4'-diisocyanatodiphenyl,
2,4-diisocyanatostilbene,
3,3'-dimethyl-4,4'-diisocyanatodiphenyl,
3,3'-dimethoxy-4,4'-diisocyanatodiphenyl,
1,4-anthracenediisocyanate,
2,5-fluorenediisocyanate,
1,8-naphthalenediisocyanate,
2,6-diisocyanatobenzfuran,
2,4,6-toluenetriisocyanate, and
2,4,4'-triisocyanatodiphenylether.

Other organic polyisocyanates are the polyisocyanates described in Canadian Patent No. 700,026 and in U.S. Patent No. 2,683,730; the phenyl indane diisocyanates which are described in U.S. Patent No. 2,855,385, the organic diisocyanates and the organic triisocyanates which are described in U.S. Patent No. 2,292,443; and the organic triisocyanates which are described in U.S. Patent No. 2,929,794.

It may be mentioned that the polyurethane foams prepared from the diphenols and blends of the diphenols with other polyols or polyesters and polymeric isocyanates such as polymethylene polyphenyl isocyanate "PAPI" have been found to possess superior resistance to burning and have better self-extinguishing characteristics than have foams made with the non-polymeric polyisocyanates, e.g. tolylene diisocyanate, under otherwise similar conditions. Polyurethane foams prepared from diphenols and polymeric polyisocyanates are a preferred class of products of the invention.

The organic polyisocyanate compounds which can be used also include the isocyanate-terminated reaction products of a molar excess of any of the above described polyisocyanates with the polyhydroxy compounds described.

In making the polyurethane foams of the invention, the proportions of the polyisocyanate compounds and the proportions of the diphenol or of the diphenol and polyols, or other compounds having active hydrogen atoms, can vary widely, but are usually employed in amounts corresponding to from about 0.9 to 2.0, preferably from 1.0 to 1.2 NCO group per active hydrogen atom in the mixture. One can provide water and excess polyisocyanate to form gases capable of expanding the reaction mass to make a foam. However, the polyurethane foams are preferably prepared employing aliphatic hydrocarbons boiling below 110° C. or halogenated aliphatic hydrocarbons boiling below 110° C. such as dichlorodifluoromethane, trichlorofluoromethane, hexane, hexene, or pentane as the blowing or foaming agent. Suitable foaming agents are disclosed in U.S. Patent No. 3,072,582.

The polyisocyanates are usually employed in an amount in excess of that theoretically required to react with the hydrogen atoms in the sum of the reactants and water in the mixture of materials, e.g. from 0.9 to 2.0, preferably in an amount corresponding to from about 1.0 to 1.2 NCO group for each OH and active hydrogen atom in the starting materials.

The polyurethane foams can be prepared by a prepolymer procedure, a one-shot process, or a batch-wise technique, all of which methods are known to the art. The products are rigid to semi-rigid foams and have closed or open cells, but usually consist of predominantly closed cells with a minor amount of open or interconnected cells.

In practice, the diphenol or a mixture of the diphenol and one or more other polyols or polyesters as hereinbefore described is reacted with a polyisocyanate in a typical urethane recipe. The recipe may employ a catalyst and oftentimes advantageously uses a plurality of catalysts such as an amine catalyst and a metal salt of an organic acid, and a cell regulating agent, together with an appropriate foaming agent such as $CH_2CCl_2$, $CCl_3F$, $CCl_2F_2$, $C_2Cl_2F_2$, $CH_2Cl_2$, $C_2H_4Cl_2$, $CHCl_2F$, $CClF_3$, and $CHClF_2$, or pentane, pentene, hexane, hexene and heptane.

Among suitable catalysts are sodium acetate; amine catalysts such as tetramethylenediamine (TMDA), tetramethyl guanidine (TMG), tetramethylethylenediamine (TMEDA), tetramethyl-1,1,3,3-butanediamine (TMBDA), triethylenediamine ("DABCO"), triethylamine (TEA), dimethylethanolamine, N-ethyl morpholine, and N-ethyl piperidine; and esters of tin, or tin salts, such as stannous oleate, stannous octoate, and dibutyl tin dilaurate. Mixtures or combinations of any two or more of the catalysts can also be used.

The catalysts can be used in amounts corresponding to from about 0.01 to 5 percent based on the total weight of the sum of the weights of the polyols initially used.

Among surface active agents or emulsifiers there may be mentioned, polypropylene glycols having molecular weights between 2000 and 8000, the liquid silicone-glycol copolymers having viscosities of from 350 to 3500 centistokes at 77° F., and polysiloxane polyoxyalkylene block copolymers as described in U.S. Pat. No. 2,834,748.

The following example illustrates a way in which the principle of the invention has been applied, but is not to be construed as limiting its scope.

EXAMPLE 1

A polyurethane foam was prepared from 4,4'-isopropylidene diphenol and a polymeric polyisocyanate employing the recipe:

| Ingredients: | Parts by weight |
|---|---|
| 4,4'-isopropylidene diphenol | 46.8 |
| Polyisocyanate (Kaiser NCO-20)[1] | 53.0 |
| Silicone surfactant | 4.0 |
| Triethyl phosphate | 15.0 |
| Trichlorofluoromethane | 20.0 |
| Sodium acetate (catalyst) | 0.5 |

[1] Kaiser NCO-20 is a polymethylene polyphenyl isocyanate having a functionality of 2.6 and the following typical properties:

| | |
|---|---|
| NCO content, wt. percent | 31–32 |
| Equivalent weight | 132–135 |
| Acidity, as HCl, wt. percent | 0.2 |
| Specific gravity (20/20° C.) | 1.2 |
| Viscosity, 25° C., up | 150–250 |
| Pour point, ° F. | 0 |
| Vapor pressure, 25° C., torr, less than $1 \times 10^{-4}$. | |
| Flash point, Cleveland Open Cup, ° F. | 420 |

The ingredients except the isocyanate were mixed in a Waring Blendor, then the isocyanate was added. The resulting mixture was stirred about 10 seconds, then was poured into an open cardboard container and allowed to foam. The product was a foam of uniform fine cells and had a density of 2.3 pounds per cubic foot. The foam was self-extinguishing when subjected to ASTM 1692–59T test.

EXAMPLE 2

This example compares the present invention (Foam #1) with the prior art (Foam Nos. 2, 3 and 4).

The following four foam formulations were foamed by mixing all the ingredients together by means of an air-driven stirrer and then blending in the isocyanate. The resulting mixture was stirred for about 10 seconds, then poured into an open paper cup container and allowed to foam.

| Component | Foam No. 1 | Foam No. 2 | Foam No. 3 | Foam No. 4 |
|---|---|---|---|---|
| Bisphenol A,[1] gm | 91.5 | None | None | None |
| Bisphenol A modified with PO,[2] gm | None | 113 | 91.5 | None |
| Voranol RN 490,[3] gm | None | None | None | 91.0 |
| PAPI,[4] gm | 108.5 | 87.0 | 108.5 | 109.0 |
| Triethylphosphate, gm | 30.0 | 30.0 | 30.0 | 30.0 |
| Silicone oil, gm | 2.0 | 2.0 | 2.0 | 2.0 |
| Trichloromonofluoromethane, gm | 35.0 | 35.0 | 35.0 | 35.0 |
| Dimethylethanolamine, gm | 1.0 | 1.0 | 1.0 | 1.0 |
| Dibutyltin dilaurate, cc | 0.3 | 0.3 | 0.3 | 0.3 |
| NCO equivalents/OH equivalents | 1/1 | 1/1 | 1.56/1 | 1/1 |

[1] Bisphenol A is p,p'-isopropylidinediphenol having an OH equivalent weight of 114.
[2] Bisphenol A modified with PO is the reaction product of p,p'-isopropylidinediphenol with propylene oxide in a mole ratio of 1 to 2, respectively, the product having an OH equivalent weight of 175.
[3] Voranol RN 490 is the reaction product of a mixture of sucrose and glycerine with propylene oxide, having an average functionality of 4.4 and an OH equivalent wt. of 113.
[4] PAPI is a 2.6 functional polymethylene polyphenylisocyanate having an NCO equivalent weight of 134.

The resultant foams were then subjected to fire retardance tests by ASTM-D-1692-67T, a chimney test and a Bureau of Mines Test. The results are given in the following table.

| Foam No. | ASTM-D-1692-67T | Chimney test[1] | Bureau of Mines test[2] |
|---|---|---|---|
| 1 | .4 in. in 60 sec | 8.3% weight loss | 50 minutes. |
| 2 | .82 in. in 60 sec | 26.2% weight loss | 12 seconds. |
| 3 | .65 in. in 60 sec | 18.6% weight loss | 15 seconds. |
| 4 | .71 in. in 60 sec | 31.8% weight loss | 58 seconds. |

[1] The procedure for conducting the chimney test is reported in Journal of Cellular Plastics, November 1967, pages 497-501.
[2] The Bureau of Mines test is reported in Journal of Cellular Plastics, Vol. 4, No. 3, pages 102-108 (1968).

The above data demonstrates that Foam No. 1 (an example of the invention described in the above-identified application) has superior fire retardant properties over those polyether polyols of the prior art (Foam Nos. 2, 3 and 4).

As to the comparison between foams 1, 2, and 4, the only difference is in the particular polyol employed. This demonstrates that the improved fire retardant properties is achieved by the use of a particular polyol, a bisphenol, as exemplified by Foam No. 1, a polyol of the present invention.

As to the comparison between foams 1 and 3, the only difference is in the particular polyol and the quantity of isocyanate employed, Foam No. 1 employing an NCO/OH ratio of 1/1 whereas Foam No. 3 employed the same quantity of isocyanate resulting in an NCO/OH ratio of 1.56/1. The comparison demonstrates that the improved flame retardant properties were achieved by use of the particular polyol of the present invention, Foam #1, and not the increased weight of the polyisocyanate, Foam #3.

I claim:

1. A foamed polyurethane product which comprises the reaction product of (1) a diphenol having the general formula

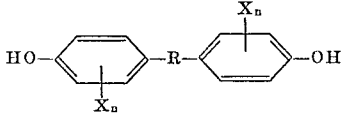

wherein R is a member of the group consisting of alkylidene radicals containing from 1 to about 8 carbon atoms,

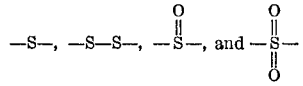

X is a member of the group consisting of halogen, and alkyl radicals having from 1 to 12 carbon atoms, and $n$ is an integer from 0 to 3; (2) a non-complexed organic polymeric polyisocyanate; (3) a blowing agent selected from the group consisting of water, volatile hydrocarbons boiling below 110° C. and halohydrocarbons boiling below 110° C.; (4) an emulsifying agent; and (5) a catalyst of urethane formation, said polyisocyanate being used in amounts corresponding to from 0.9 to 2.0 NCO group for each active H atom in the mixture of reactive materials.

2. A foamed polyurethane product as claimed in claim 1 wherein the diphenol is 4,4'-isopropylidene-diphenol.

3. A foamed polyurethane product as claimed in claim 1 wherein the polyisocyanate is polymethylene polyphenylisocyanate.

4. A foamed polyurethane product as claimed in claim 1 wherein the blowing agent is trichlorofluoromethane.

5. A foamed polyurethane product as claimed in claim 1 wherein the polyisocyanate is used in amounts corresponding to from 1.0 to 1.2 NCO group for each active H atom in the mixture of reactive materials.

References Cited
UNITED STATES PATENTS

| | | | |
|---|---|---|---|
| 3,598,771 | 8/1971 | Davis | 260—2.5 AM |
| 3,422,165 | 1/1969 | Brotherton | 260—2.5 AT |
| 2,284,896 | 6/1942 | Hanford | 260—214 |
| 2,284,637 | 6/1942 | Catlin | 260—47 CB |

DONALD E. CZAJA, Primary Examiner

C. W. IVY, Assistant Examiner

U.S. Cl. X.R.

260—2.5 AJ, 47 CB